May 29, 1951        J. F. SCHNEIDER        2,554,505

BULLDOZER ATTACHMENT FOR TRACTORS

Filed Dec. 21, 1945

Inventor
John F. Schneider,

By Clarence A. O'Brien
and Harvey B. Jacobson
Attorneys

Patented May 29, 1951

2,554,505

UNITED STATES PATENT OFFICE 2,554,505

BULLDOZER ATTACHMENT FOR TRACTORS

John F. Schneider, Lowell, Ind.

Application December 21, 1945, Serial No. 636,470

1 Claim. (Cl. 37—144)

There is disclosed in the following specification and the drawings accompanying the same and forming a part of this application for patent an invention the primary purpose of which is to provide a removable bull-dozer attachment for tractors of the crawler type whereby the tractor may accomplish the work of two machines.

Another object of the invention is to provide a detachable bull-dozer adapted for use upon a tractor and in which means is provided to adjust the depth of the cut and the angle of the cut.

A further object of this invention is to provide a bull-dozer attachment including a plurality of sensitive control adjustments.

Other features and advantages will become more readily apparent from the following description and the accompanying illustrative drawings in which.

Figure 1:
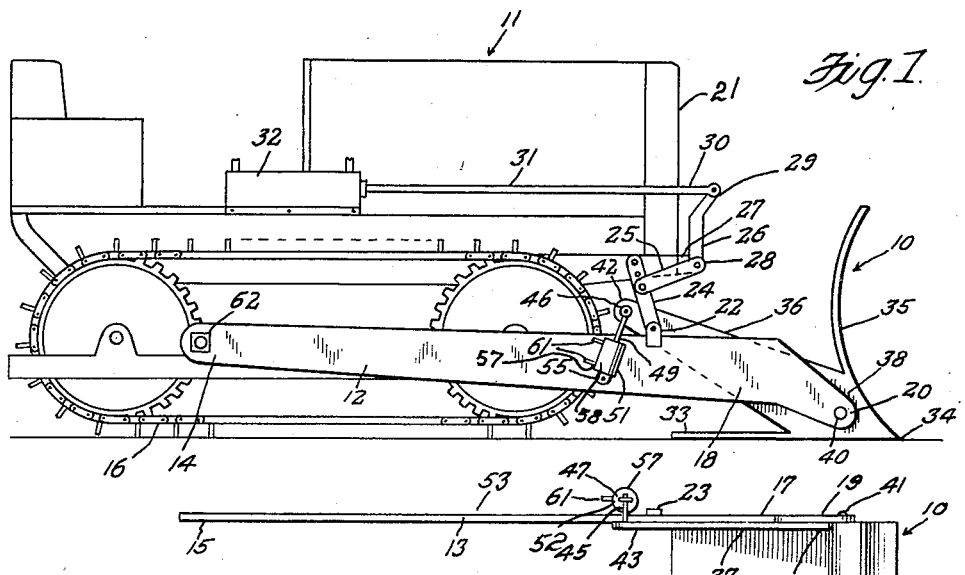
Figure 1 is an elevational view of a tractor embracing the invention.
Figure 2:
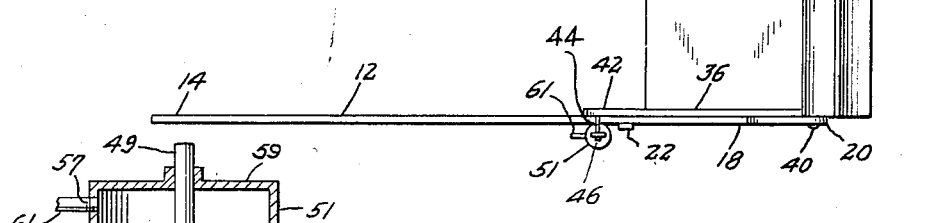
Figure 2 is a plan view of the bull-dozer detached from the tractor.
Figure 3:
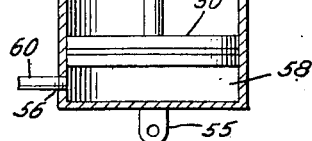
Figure 3 is a detail vertical sectional view of a control cylinder, two of which are required.

In the accompanying drawings, and in the following specification, the same reference characters are used to designate the same parts and elements throughout and in which 10 refers to the invention in its entirety and 11 indicates a tractor, preferably of the crawler type. However, the device may be made for farm tractors and for use as a snow plow.

The device consists of a pair of suitably spaced elongated arms 12 and 13, the rear ends 14 and 15 of which are pivotally attached to the chassis of the tractor 11 at any convenient point and outwardly of the crawlers 16 of the tractor. Both of said arms 12 and 13 taper from the ends 14 and 15 to increased width at their forward ends 17 and 18 and at which points they incline down to reduced terminals 19 and 20 which extend forward of the front end 21 of the tractor.

Brackets 22 and 23 are attached to the arms 12 and 13 inwardly of their ends 17 and 18, to which the links 24 are adapted to be pivotally connected and in turn pivoted to the arms 25 of bell cranks 26, which cranks are pivoted to the forward end 27 of the tractor chassis as at 28. To the outer end 29 of the crank 26 is pivoted the end 30 of a piston rod 31 actuated through the medium of a fluid controlled piston in a cylinder 32 on the tractor whereby the bull-dozer 10 may be lowered for action and raised for transportation.

The bull-dozer proper consists of a land slide 33 to the forward cutting edge 34 of which the arcuate shovel 35 is preferably integrally connected, and also integrally connecting the members 33 and 35 are side arms 36 and 37, the web portions 38 and 39 of which are pivoted to the said terminals 19 and 20 of arms 12 and 13, as indicated at 40 and 41. The arms 36 and 37 incline and taper upwardly and rearwardly to terminals 42 and 43 to each of which are connected the outwardly projecting pins 44 and 45, which cross over the arms 12 and 13 and are attached to the ends 46 and 47 of piston rods 48 and 49 of pistons 50 operating in cylinders 51 and 52, which are mounted upon the outer sides 53 and 54 of the arms 12 and 13 by means of bracket arms 55. These cylinders 51 and 52 are provided with ports 56 and 57 at their respective ends 58 and 59, to which ports are connected flexible hose 60 and 61, which are in turn connected to a source of fluid supply (not shown) which is valve controlled and through the action of which valves both piston rods 48 and 49 may be raised or lowered together or independently of one another for sensitive control and adjustment of the bull-dozer plow and whereby the plow may be either inclined from side to side or flexed if formed of a somewhat flexible steel. The admission of fluid through port 60 will raise the piston 48 and by reversing the action and admitting the fluid into port 61, the piston will be lowered, the action being transferred to arm 36 or 37, or both simultaneously for fine adjustment of the plow.

From the foregoing it will appear that a bulldozer attachment is provided for a tractor which will accomplish the work of an ordinary bull-dozer and at a comparatively very small expense aside from the tractor and which attachment is readily removable in order that the tractor may be used for its ordinary function without the bull-dozer being connected thereto.

Having now described the invention that which is claimed to be new and desired to be procured by Letters Patent is:

For use on a tractor which has a tractor hydraulic cylinder and a piston rod extending therefrom toward the front of the tractor, an attachment comprising a plow having a pair of plates extending therefrom, arms, each pivoted at one end to the tractor and said plates being pivoted at the opposite ends of said arms adjacent said plow, cylinders having pistons and pivotally secured to said arms and said plates respectively for pivotally operating said plow with respect to said arms, a link having a plurality of apertures and pivoted to one of said arms, and a bellcrank carried by the tractor and pivoted at its ends to the tractor piston rod and in one of said apertures respectively, whereby when the tractor hydraulic cylinder piston rod is operated said arms are selectively raised and lowered, thereby lifting and lowering said plow.

JOHN F. SCHNEIDER.

REFERENCES CITED

The following references are of record in the file of this patent:

UNITED STATES PATENTS

| Number | Name | Date |
|---|---|---|
| 1,597,123 | Turner | Aug. 24, 1926 |
| 1,964,360 | LeTourneau | June 26, 1934 |
| 2,216,572 | Nichols, Jr. | Oct. 1, 1940 |
| 2,224,725 | Felt, Jr. | Dec. 10, 1940 |
| 2,238,346 | Sorensen | Apr. 15, 1941 |
| 2,408,268 | Peterson | Sept. 24, 1946 |